United States Patent
Jain et al.

(10) Patent No.: US 11,902,247 B2
(45) Date of Patent: Feb. 13, 2024

(54) METHODS AND SYSTEMS OF APPLICATION SECURITY MESH USER INTERFACES

(71) Applicant: VMware, LLC, Palo Alto, CA (US)

(72) Inventors: Amit Jain, Saratoga, CA (US); Gopi Krishna, Saratoga, CA (US); Pratik Roychowdhury, Menlo Park, CA (US)

(73) Assignee: VMware, Inc., Palo Alto, CA (US)

( * ) Notice: Subject to any disclaimer, the term of this patent is extended or adjusted under 35 U.S.C. 154(b) by 116 days.

(21) Appl. No.: 17/105,495

(22) Filed: Nov. 25, 2020

(65) Prior Publication Data

US 2021/0160214 A1 May 27, 2021

Related U.S. Application Data

(60) Provisional application No. 62/940,097, filed on Nov. 25, 2019.

(51) Int. Cl.
*G06F 15/173* (2006.01)
*H04L 9/40* (2022.01)

(52) U.S. Cl.
CPC ...... *H04L 63/0218* (2013.01); *H04L 63/0281* (2013.01); *H04L 63/166* (2013.01)

(58) Field of Classification Search
CPC .................................................. H04L 63/0218
USPC ......................................................... 709/242
See application file for complete search history.

(56) References Cited

U.S. PATENT DOCUMENTS

| | | | |
|---|---|---|---|
| 2009/0088963 A1* | 4/2009 | Horiguchi | G08G 1/096844 701/532 |
| 2009/0259769 A1* | 10/2009 | Lakshmanan | H04L 45/02 709/241 |
| 2011/0208824 A1* | 8/2011 | Lidstrom | H04W 48/18 709/206 |
| 2015/0299965 A1* | 10/2015 | Collie | E01F 7/02 404/1 |

* cited by examiner

*Primary Examiner* — Jeffrey C Pwu
*Assistant Examiner* — Samuel Ambaye
(74) *Attorney, Agent, or Firm* — King Intellectual Asset Management

(57) ABSTRACT

A computerized method for implementing distributed application security mesh systems comprising: providing a service graph; and providing an underlying mesh graph with a pre-defined paths.

21 Claims, 20 Drawing Sheets

300

400

500

600

METHODS AND SYSTEMS OF APPLICATION SECURITY MESH USER INTERFACES

CLAIM OF PRIORITY

This applications claims priority to U.S. Provisional Application No. 62/940,097, titled METHODS AND SYSTEMS OF APPLICATION SECURITY MESH USER INTERFACES, and filed on Nov. 25, 2019. This application is hereby incorporated by reference in its entirety.

BACKGROUND

Improvements to application security mesh user interfaces are desired.

SUMMARY OF THE INVENTION

A computerized method for implementing distributed application security mesh systems comprising: providing a service graph; and providing an underlying mesh graph with a pre-defined paths.

Figure 1:
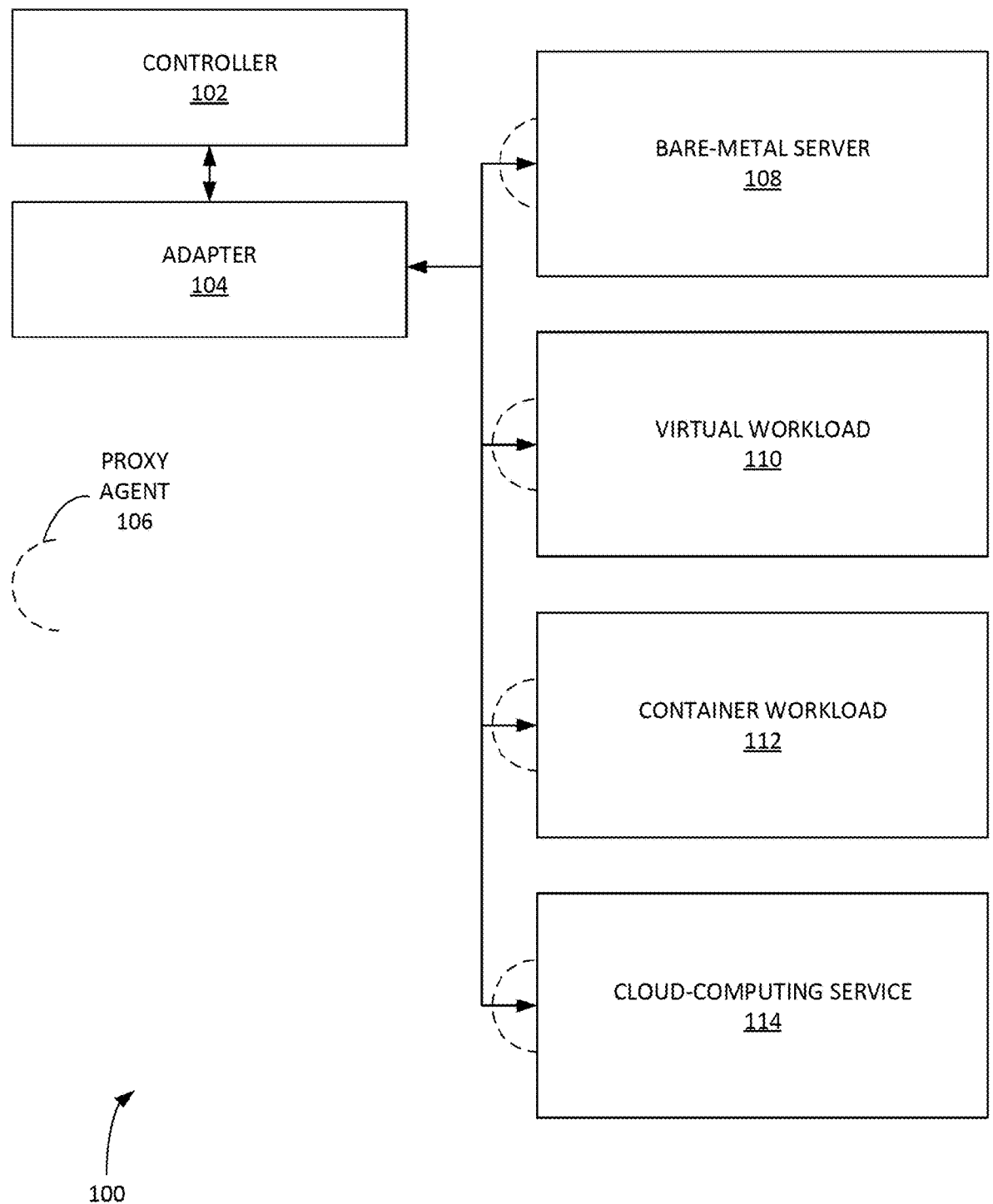
FIG. 1 is a simplified block diagram of distributed application security mesh system, according to some embodiments.

The Figures described above are a representative set and are not an exhaustive with respect to embodying the invention.

DESCRIPTION

Disclosed are a system, method, and article for securing application security mesh user interfaces. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Adapter can be an optional intermediary element that is deployed between controller and the distributed proxy agent.

Application programming interface (API) can specify how software components of various systems interact with each other.

Application security mesh can be a distributed security solution.

Cloud computing can involve deploying groups of remote servers and/or software networks that allow centralized data storage and online access to computer services or resources. These groups of remote serves and/or software networks can be a collection of remote computing services.

Controller can provide a centralized policy management and operational view. The controller acts a central control point for configuring various elements and policies. The controller also acts as an aggregation point for collecting telemetry data from distributed security mesh proxy agents and to execute various analytics to provide various insights into mesh's operation. These insights can include, inter alia: security insights, performance related insights or operational related insights.

Distributed Proxy Agent (also called a proxy agent herein) can be an element that is inserted in a distributed manner to provide distributed telemetry collection and policy enforcement points. Distributed Proxy Agent can be deployed in various form factors including, but not limited to, a software only solution that can be run in either a publicly available computer hosting environment (e.g. in a cloud-computing platform) and/or in the customer's environment. Distributed Proxy Agent can also be deployed as a purpose made hardware appliance or software only appliance in either a publicly available computer hosting environment (e.g. in a cloud-computing platform) and/or in the customer's environment.

Service graph (e.g. an Application Map or Application Dependency Map) is a graphical view that shows the various nodes and the interaction of those with each other. These nodes could be workloads (e.g. virtual machines or containers and in future serverless functions) or services (or microservice) which offer a particular functionality within a workload. An example workload can be a payment service within an e-commerce application workload can take in credit card and process it.

Transport Layer Security (TLS), and its now-deprecated predecessor is a cryptographic protocol designed to provide communications security over a computer network.

Example Systems

FIG. 1 is a simplified block diagram of distributed application security mesh system 100, according to some embodiments. Application security mesh system 100 includes, inter alia, three components: controller 102, adapter 104 and proxy agent 106.

Controller 102 provides a centralized policy management and operational view. Additional information about controller 102 is provided in the description of FIG. 2 infra.

System 100 includes adapter 104. Adapter 104 can be a gateway that acts as an aggregation point for policy download and telemetry upload to controller 102. Additional information about adapter 104 is provided in the description of FIG. 2. It is noted that adapter 104 can be optional in some example embodiments. As an optional element, in application security mesh system 100, when adapter 104 is not deployed, a proxy agent 106 can use the adapter functionalities while working with controller 102 directly without having an intermediate adapter element.

Proxy agent 106 can be a distributed element that is inserted in the request path of every application. Proxy agent 106 can provide both security policy and telemetry enforcement. Proxy agent 106 can have different implementations and insertion mechanisms to meet requirements of different deployment environments. Example employment environments include, inter alia: bare-metal server 108, virtual workload 110, container workload 112, various cloud-computing platforms 114, etc. Additional information about proxy agent 106 is provided in the description of FIG. 2.

Figure 2:
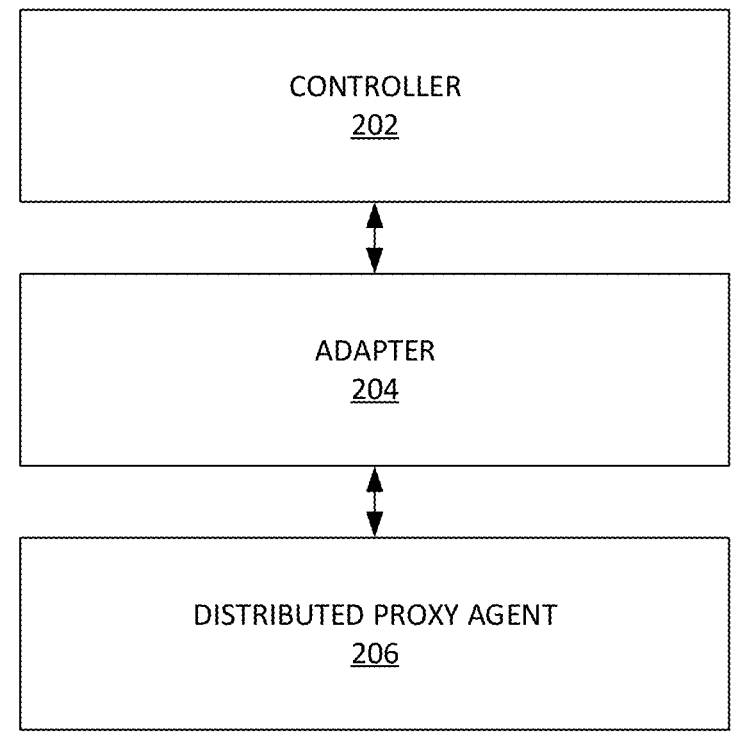
FIG. 2 illustrates an additional simplified block diagram of distributed application security mesh system, according to some embodiments.

FIG. 2 illustrates an additional simplified block diagram of distributed application security mesh system 200, according to some embodiments. Distributed application security mesh system 200 can be used to supplement distributed application security mesh system 100.

Controller 202 provides a centralized policy management and operational view. Controller 202 acts a central control point for configuring various elements and policies within a security mesh. Controller 202 also acts as an aggregation point for collecting telemetry data from distributed security mesh proxy agents and to execute various analytics to provide various insights into security mesh system's operation. The insights may include, inter alia: security insights, performance related insights or operational related insights, etc. Centralized controller functionality can include, inter alia, various functions, such as: the ability to allow various administrative users to login and configure the various policies to be applied to security mesh. It is noted that various supported policy types and the mechanisms surrounding the automation policy discovery and inference is provided infra.

Controller 202 can provide a connection point to various distributed proxy agents 106 in the application security mesh system 200 such that various distributed proxy agents 206 can have security connectivity/channel to controller 202. A connection between controller 202 and distributed proxy agents 206 be provided. The connect can use various secure channel mechanism (e.g. TLS). The connection can also use mutual authentication mechanism (e.g. client certificate(s), etc.) to ensure that only authenticated clients can connect to the authenticated controller. Controller 202 can deploy, un-deploy and monitor various distributed proxy agents 206 in the security mesh system. Controller 202 can send policy information to the distributed proxy agents 206 in a secure manner. Controller 202 can receive telemetry from the distributed proxy agents. Distributed proxy agents 206 collect various type of data about the application and sends it to controller 202. Controller 202 can connect with external services to augment controller's functionality.

For example, controller 202 can connect with an external security service such as threat intelligence, anti-virus, anti-malware, or reputation service etc. that enhances controller's security related functions. Controller 202 can be deployed in various form factors including, inter alia: a software only solution that can be run in either a publicly available computer hosting environment (e.g. a cloud-computing platform) and/or in the customer's environment. Controller 202 can also be deployed as a purpose made hardware appliance or software only appliance in either a publicly available computer hosting environment and/or in the customer's environment. Additionally, controller 202 can be included various software modules, as needed, to achieve the expressed and implicit controller functions.

Adapter 204 can be an intermediary element that is deployed between controller 202 and distributed proxy agent 206. Adapter 204 can be optional is some example embodiments. Adapter 204 is deployed to facilitate connectivity between controller 202 and distributed proxy agent(s) 206. Adapter 204 functionality can include functions, such as, inter alia: the ability to connect out to controller 202 and establish a security channel to controller 202. The connection between adapter 204 and controller 202 can use any appropriate secure transport mechanism (e.g. TLS, etc.). The connect can also use mutual authentication mechanism(s) (e.g. a client certificate, etc.) to ensure that both adapter 204 and controller 206 are mutually authenticated. Adapter 204 can provide a connection point to various distributed proxy agents 206 in the security mesh system. In this way, various distributed proxy agents 206 can have a security connectivity/channel to adapter 204. The connection between adapter 204 and distributed proxy agents 206 uses various secure channel mechanism (e.g. TLS, etc.) and also may use mutual authentication mechanism (e.g. client certificate, etc.) to ensure that authenticated clients can connect to the authenticated controller. Adapter 204 can receive various policies from controller 202 and pass it on to distributed proxy agents 206 with and without modification. Adapter 204 can deploy, un-deploy and monitor various distributed proxy agents 206 in the application security mesh system 200. Adapter 204 can send policy information to the distributed proxy agents 206 in a secure manner. Adapter 204 can receive telemetry from distributed proxy agents 206. Distributed proxy agents 206 collect various type of data about the application and sends it to adapter. Adapter 204 can transmit the received telemetry from agents to controller 202. Adapter 204 may add additional context to the received telemetry before transmitting it to controller. Adapter 204 can connect with external services to augment adapter's functionality. For example, adapter 204 can connect with an external security service (such as, inter alia: threat intelligence, anti-virus, anti-malware, or reputation service etc.) that enhances controller's security related functions. Adapter 204 can be deployed in various form factors including, inter alia, to a software only solution that can be run in either a publicly available computer hosting environment (e.g. a cloud-computing platform) and/or in the customer's environment. Adapter 204 can be deployed as a purpose made hardware appliance or software only appliance in a publicly available computer hosting environment. Adapter 204 can be deployed in the customer's environment.

Distributed proxy agent 206 can be an element that is inserted in a distributed manner to provide a distributed telemetry collection and policy enforcement points. Distributed proxy agent 206 can include an adapter functionality. Distributed proxy agent 206 can have the following functions. Distributed proxy agent 206 can connect out to adapter 204 and establish a security channel to adapter 204. Distributed proxy agent 206 can provide a connection between an agent and adapter 204. Distributed proxy agent 206 can use appropriate secure transport mechanism (e.g. TLS etc.) and/or use mutual authentication mechanism (e.g. client certificate, etc.) to ensure that both agent and adapter are mutually authenticated. Distributed proxy agent 206 can receive various policies from adapter 204. Distributed proxy agent 206 can provide various security functions (e.g. authentication, access control, request/response validation, content inspection and data loss prevention etc.) used to enforce the policies. Distributed proxy agent 206 can capture and process network traffic going in and existing from an application. Distributed proxy agents 206 can collect various type of data about the application and sends it to adapter. Distributed proxy agent 206 can connect with external services to augment agent's functionality. For example, in one instance, distributed proxy agent 206 can connect with an external security service (such as, inter alia: threat intelligence, anti-virus, anti-malware or reputation service etc.) that enhances agent's security related functions. Distributed proxy agent 206 can open one or more than one secure channel to adapter. The number of channels can be determined based on functionality or on some other basis (e.g. performance).

In one example, adapter 204 can be an optional element. According, in an environment when adapter is not deployed, Distributed proxy agent 206 can use above capabilities while working with controller directly (e.g. without having an intermediate adapter element). Distributed proxy agent 206 can be deployed in various form factors (e.g. a software only solution that can be run in either a publicly available computer hosting environment and/or in the customer's environment). Distributed proxy agent 206 can also be deployed as a purpose made hardware appliance or software only appliance in either a publicly available computer hosting environment and/or in the customer's environment.

Example Interfaces

The application security mesh can be used to addresses security and compliance issues for distributed applications (e.g. microservices-based or otherwise). The application security mesh can be used to provide discovery, attack detection, security for privacy, and API collaboration features. The interactions between the different nodes of the application security mesh can be modeled like a map where the nodes are destinations and the interactions (e.g. lines) are either local roads or highways. Local roads are defined as lines those that touch the nodes. Highways are defined as lines that go either top-to-bottom (e.g. north-south) or side-to-side (e.g. east-west), but do not touch any of the nodes.

Figure 9:
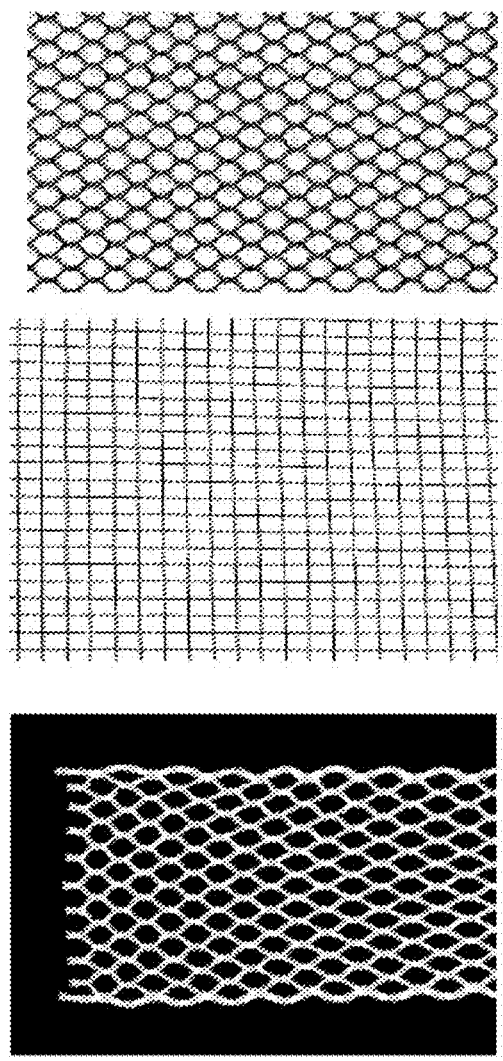
FIGS. 9-18 illustrates example views of various service graph layouts of an application security mesh according to some embodiments.
Figure 10A:
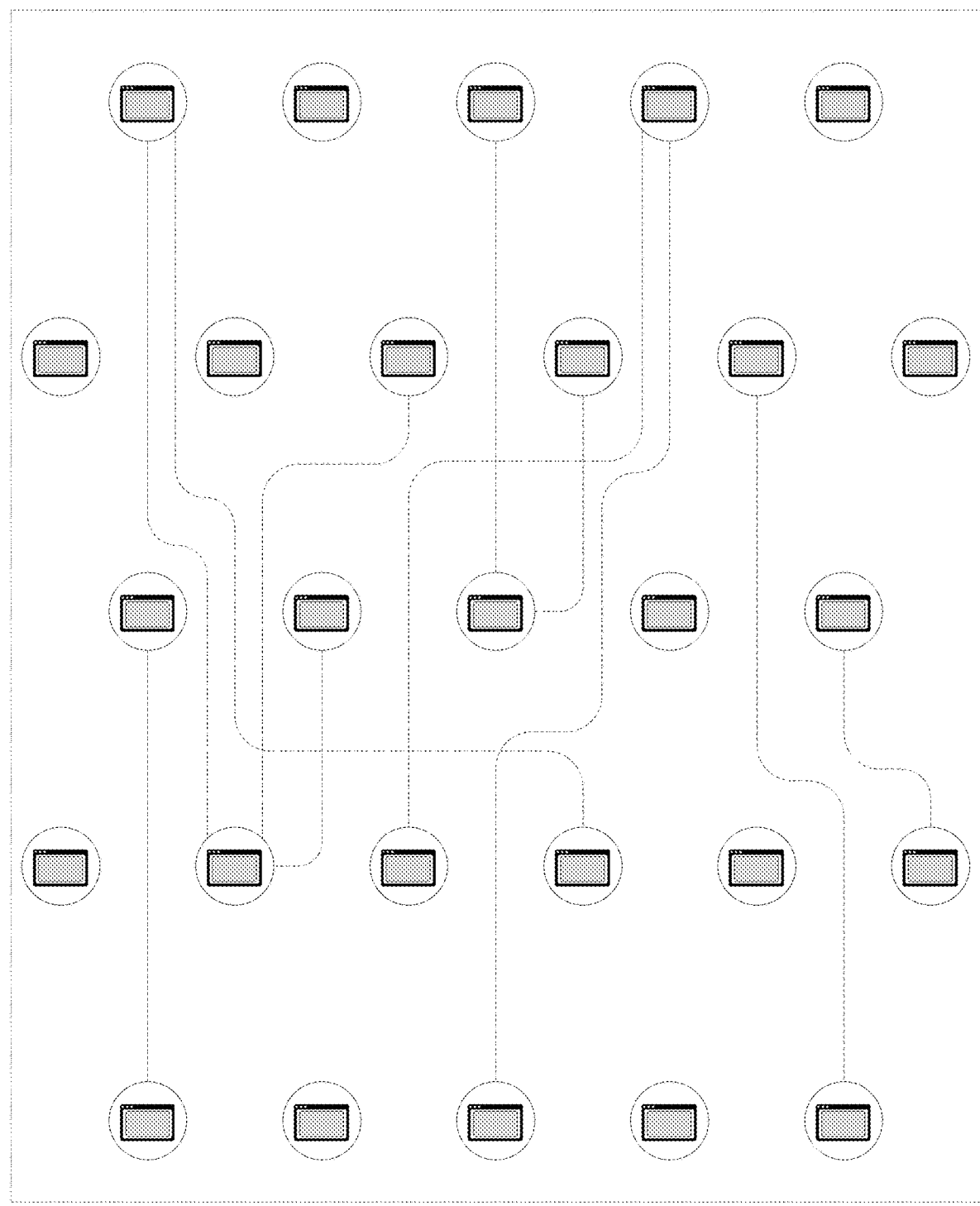
Figure 10B:
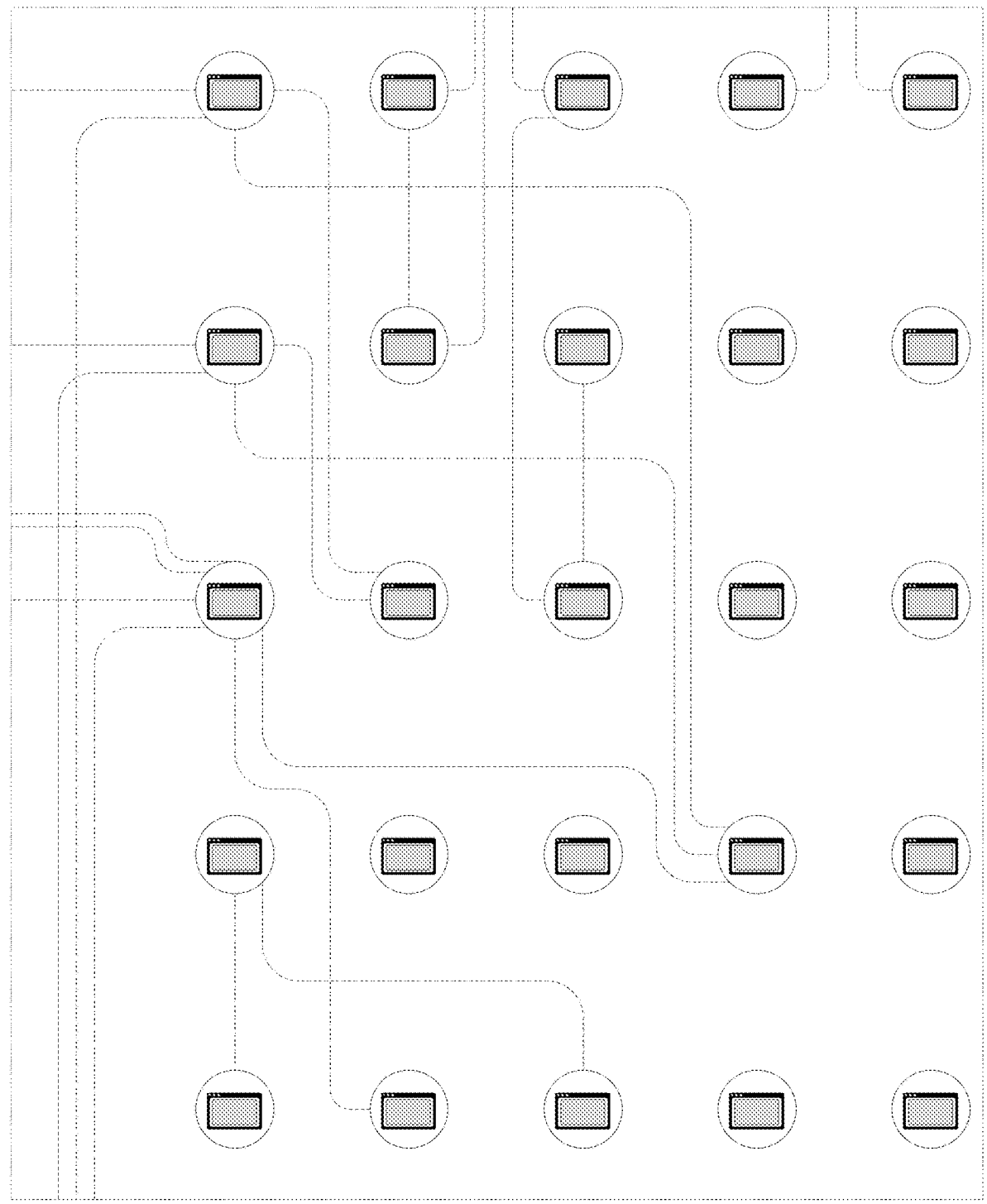
Figure 11A:
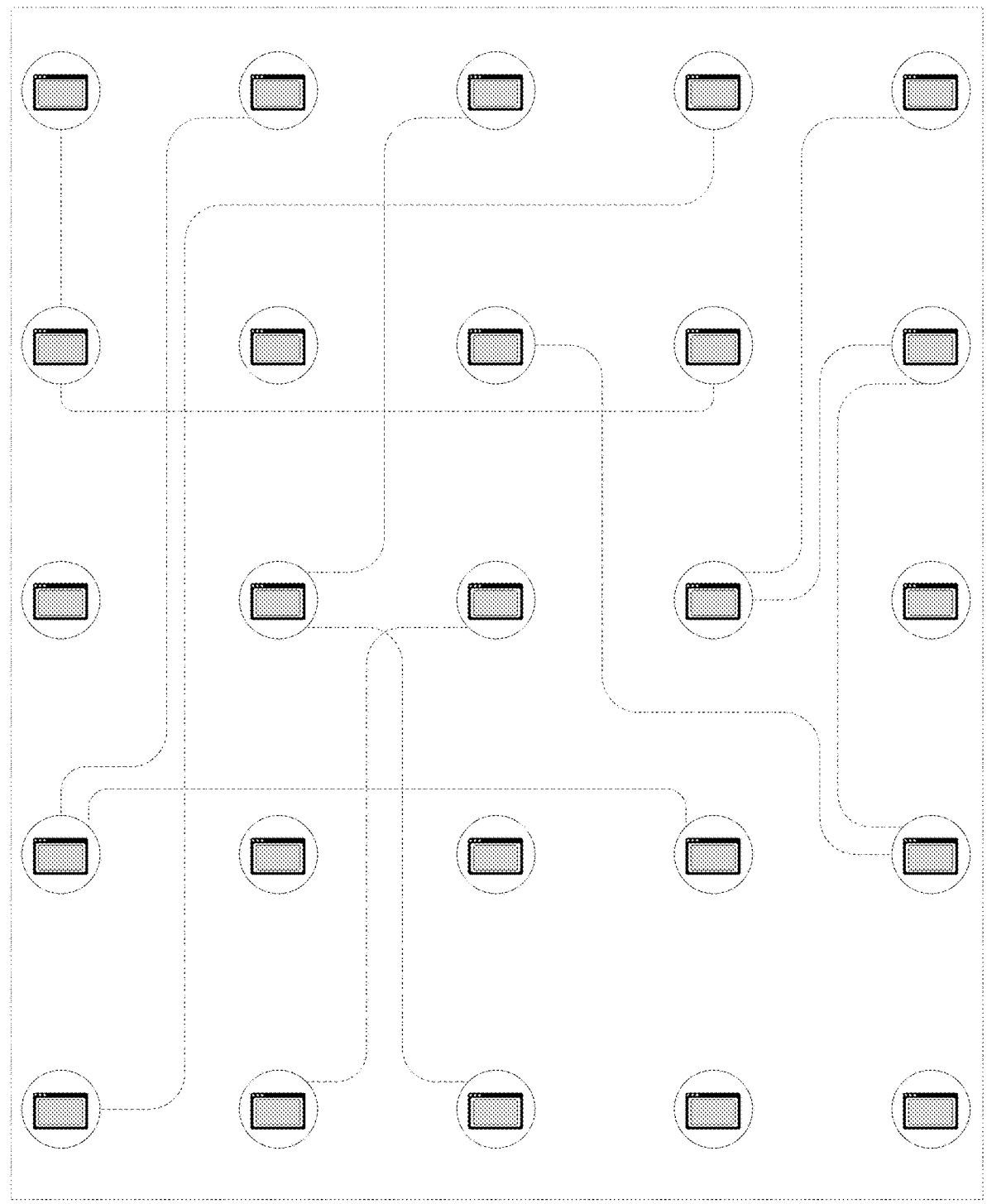
Figure 11B:
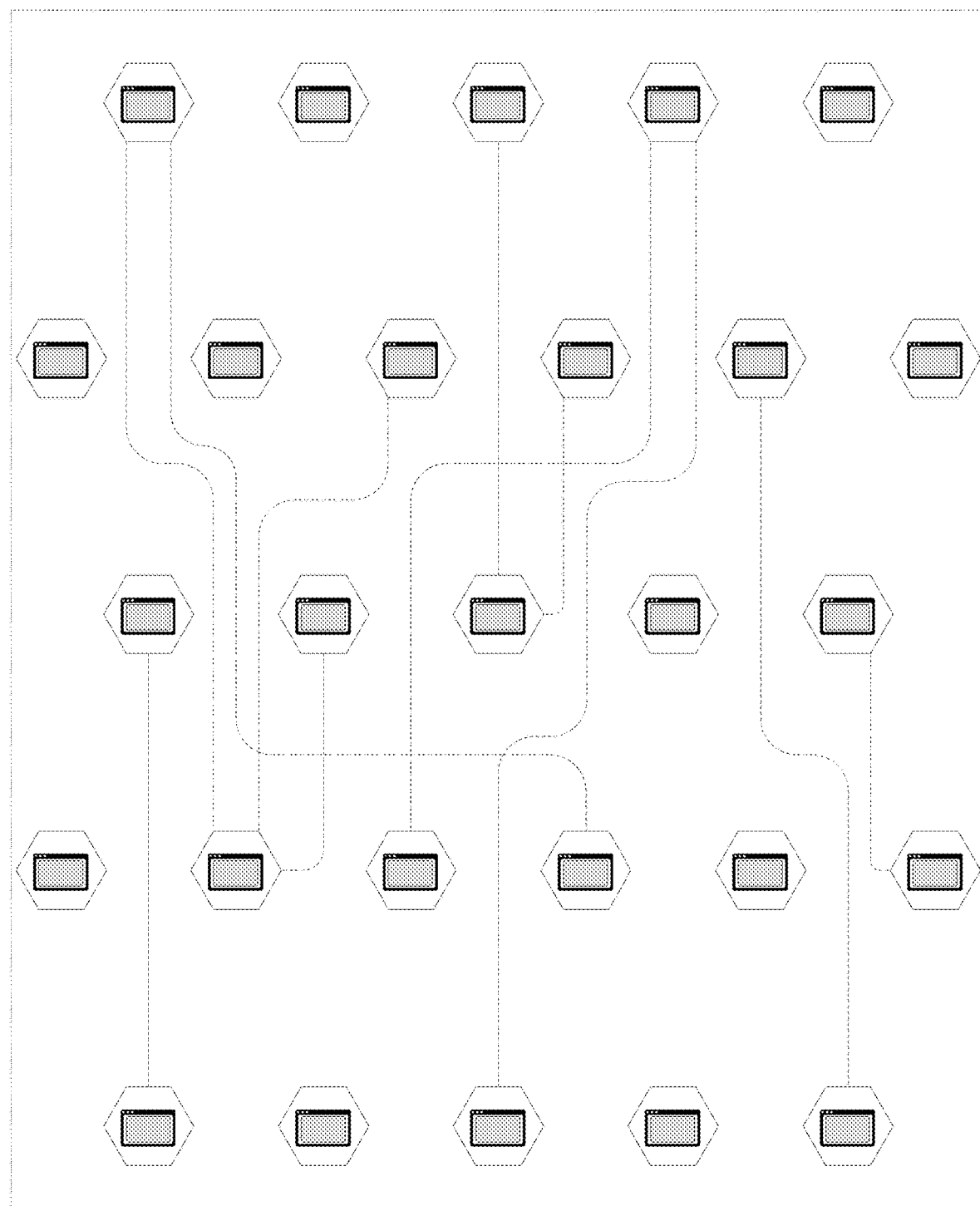
Figure 12:
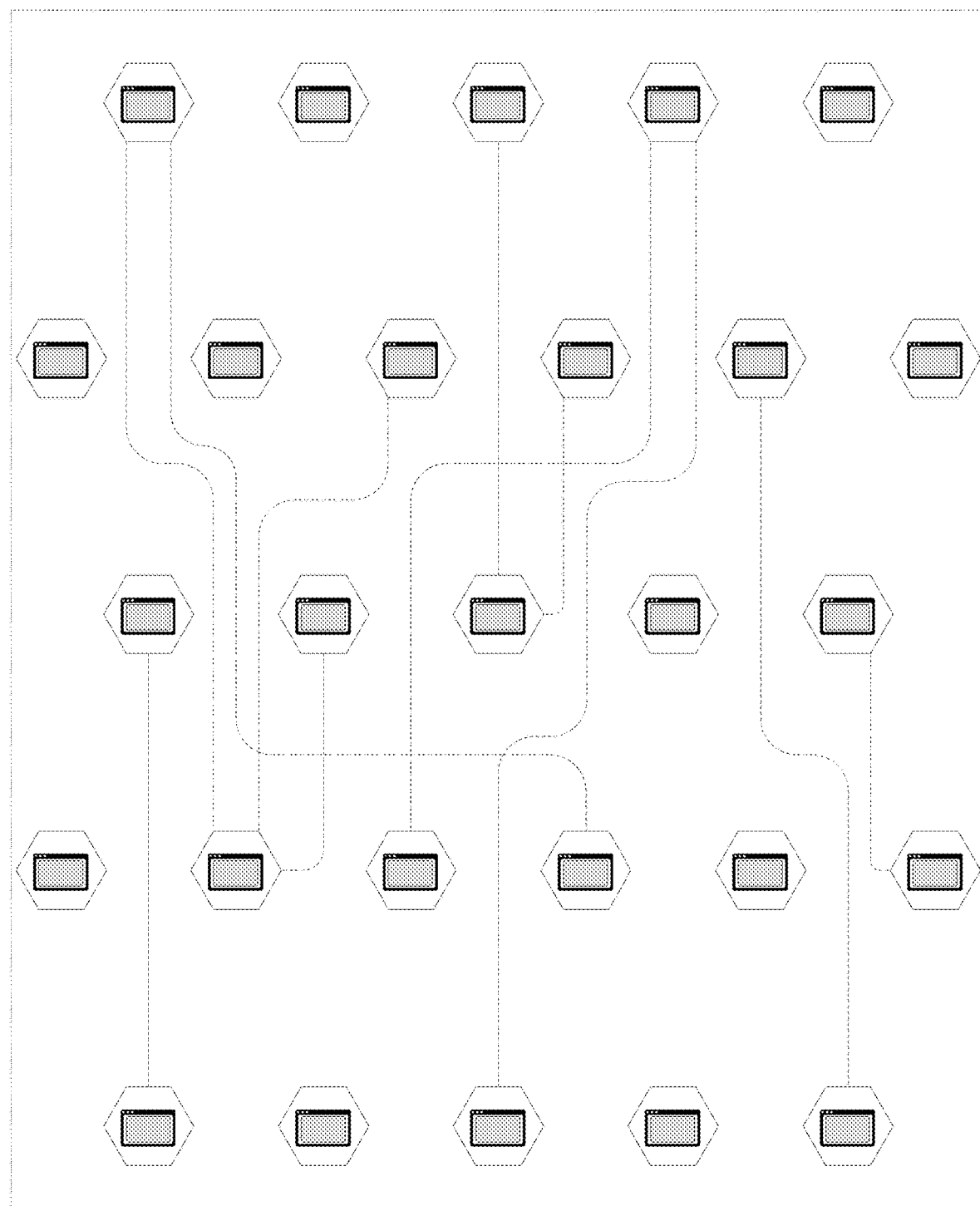
Figure 13:
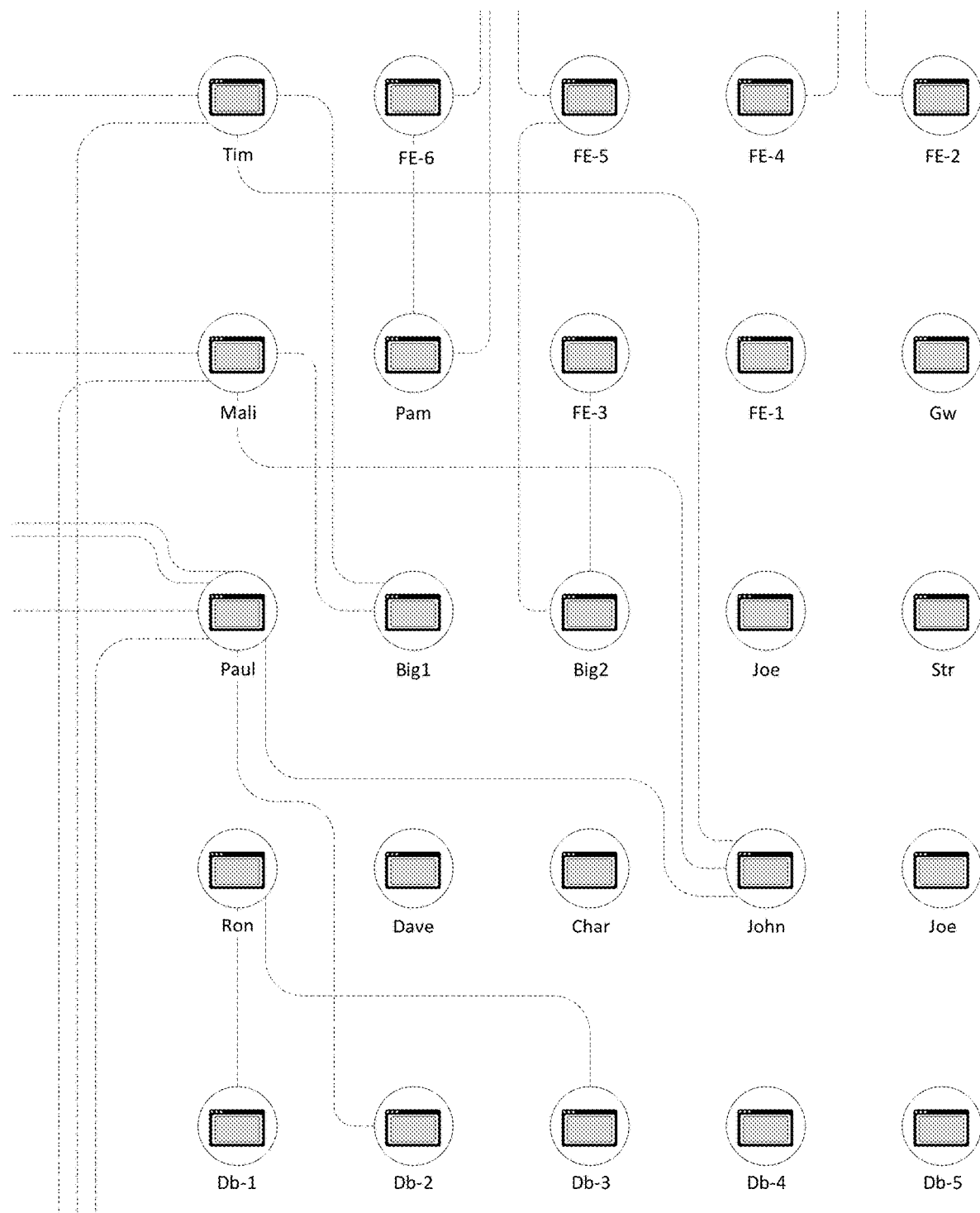
Figure 14:
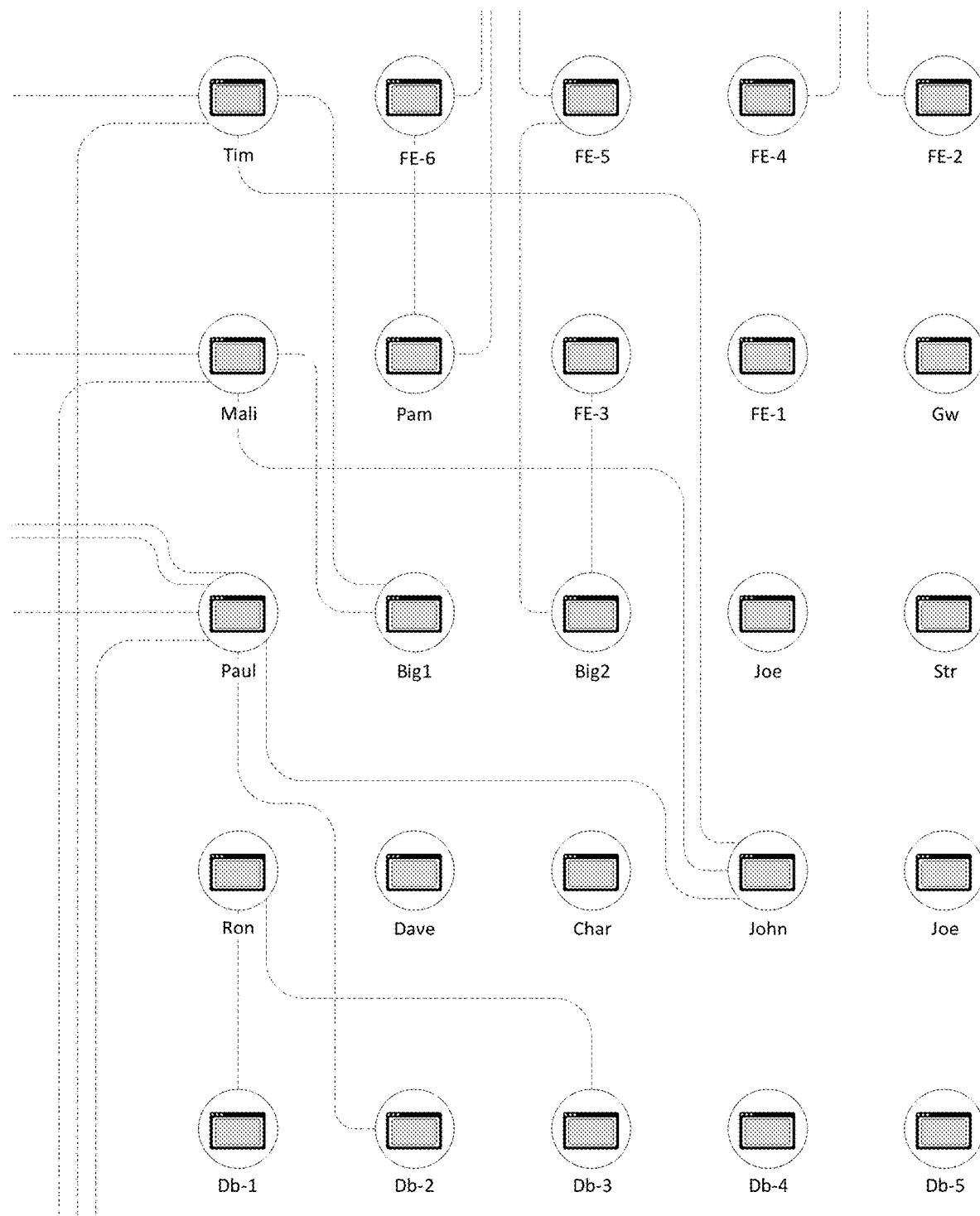
Figure 15:
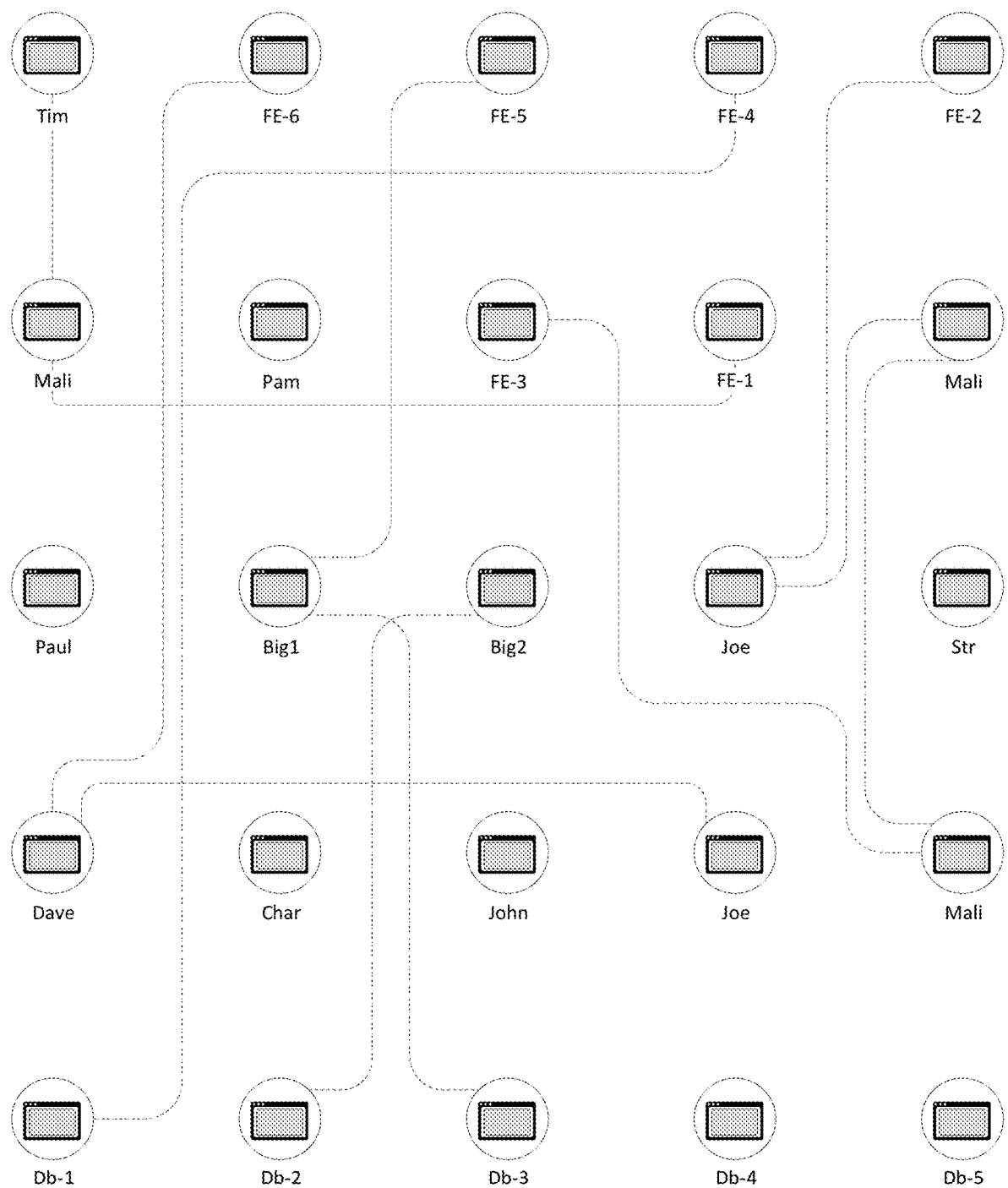
Figure 16:
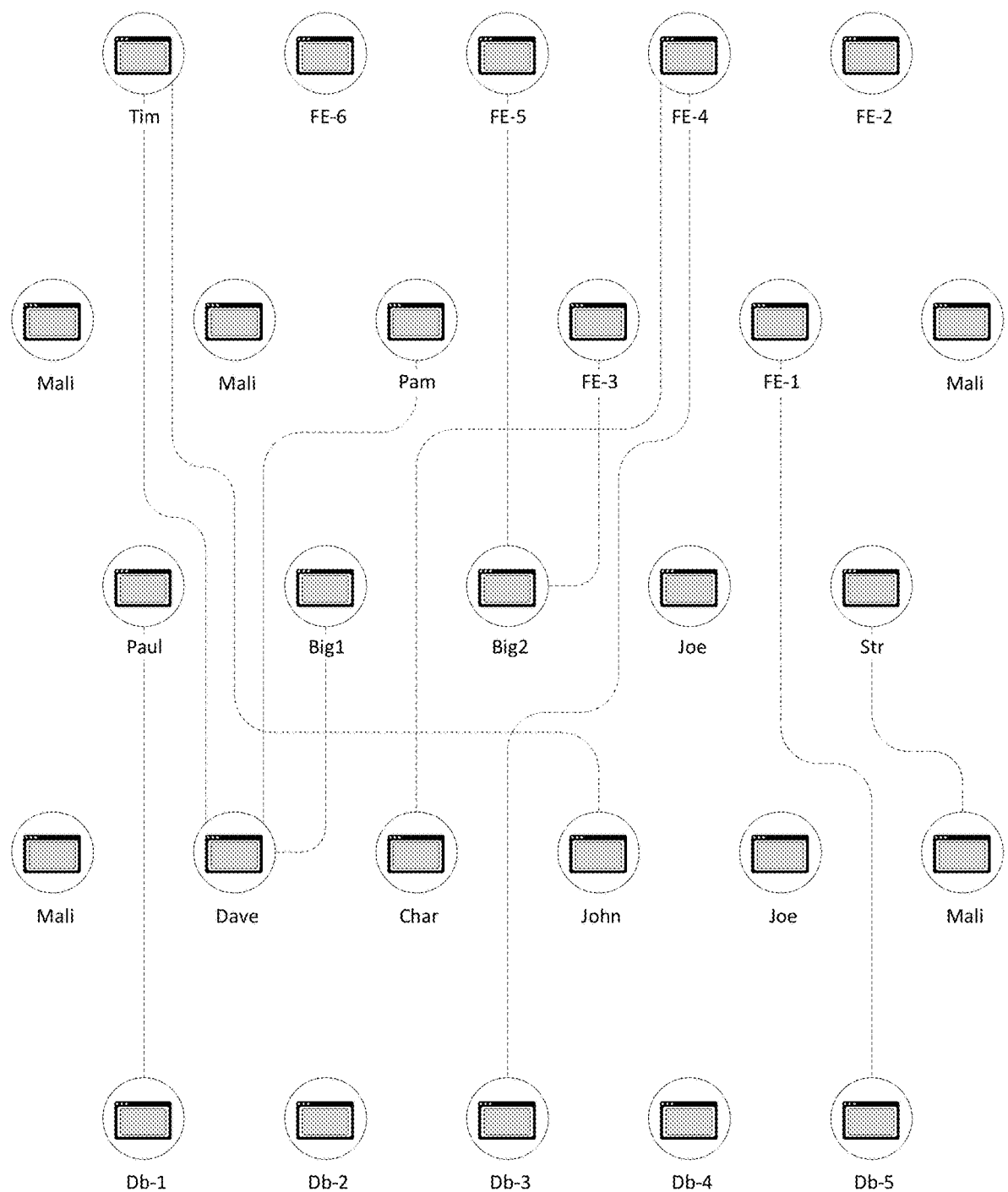
Figure 17:
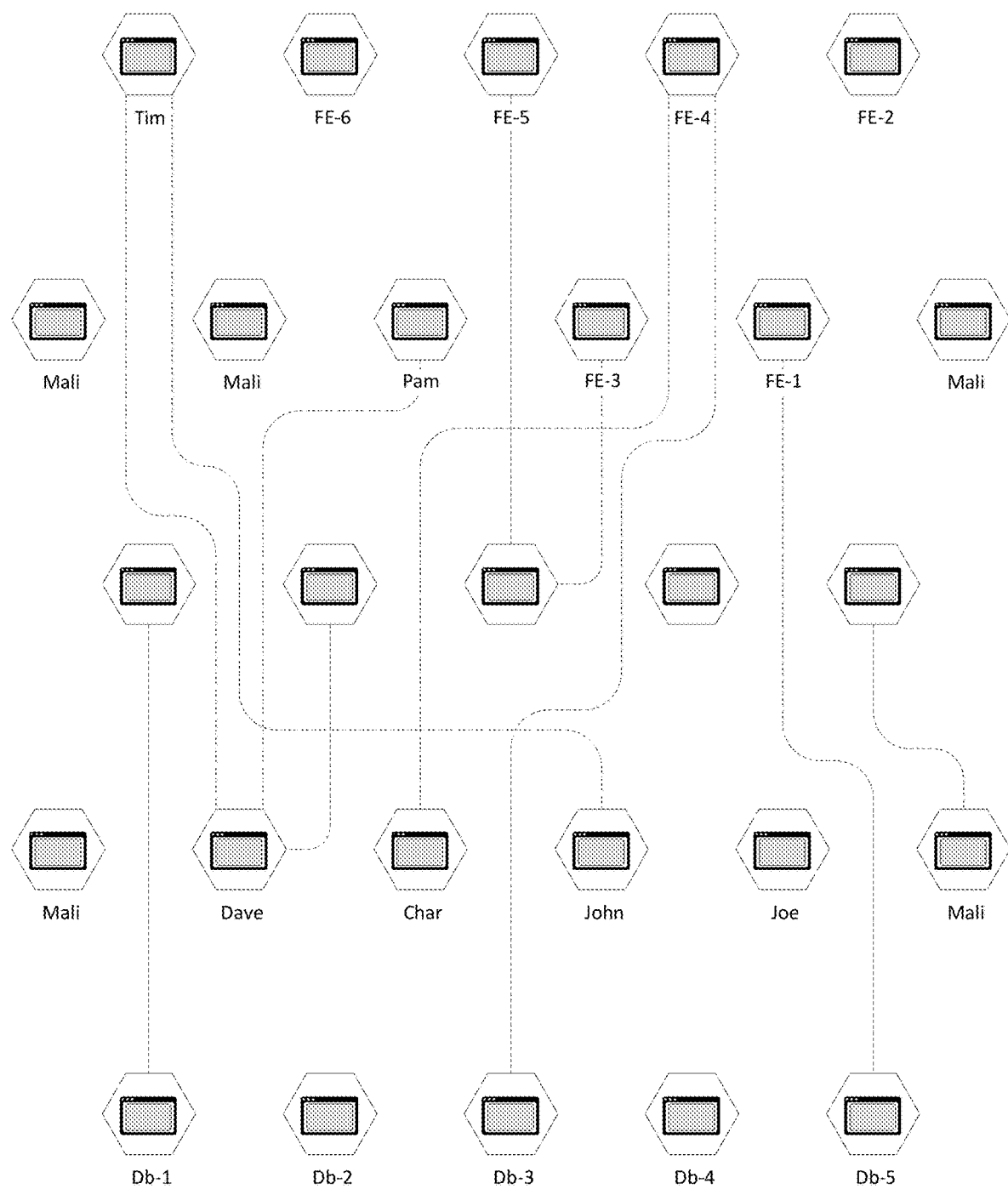
Figure 18:
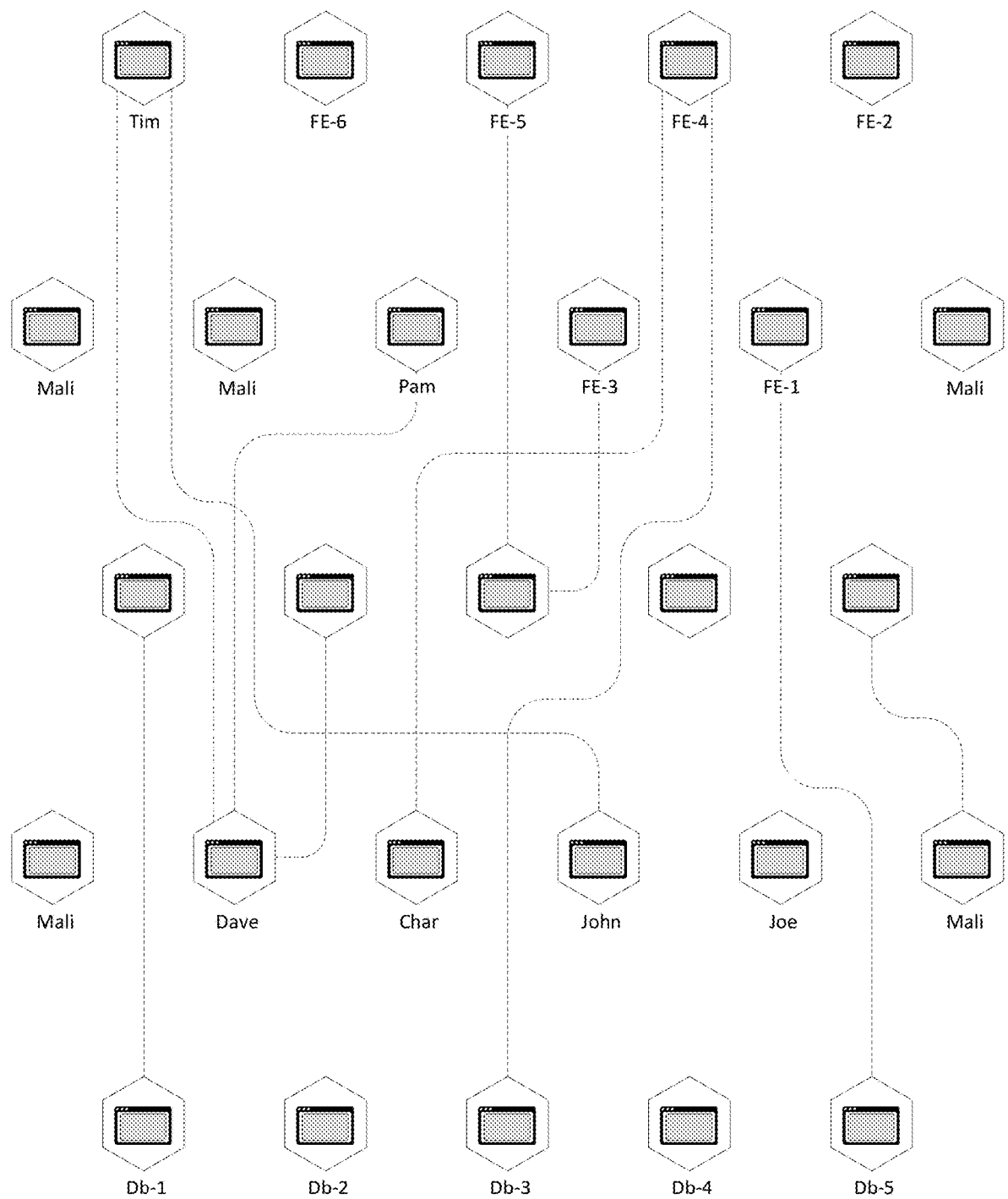

It is noted that FIG. 9 illustrates examples of a mesh format that be used as a basis for a service graph lay-out. FIGS. 10A, 10B, 11A, 11B, and 12-18 illustrate examples of various service graph layouts. These mesh-based service graph layouts can be utilized in the following processes.

Other node attributes can provide graphical symbols of node type. For example, the color of the services icons can represent the health of the service from security or traffic utilization perspective.

Example Processes

Figure 7:
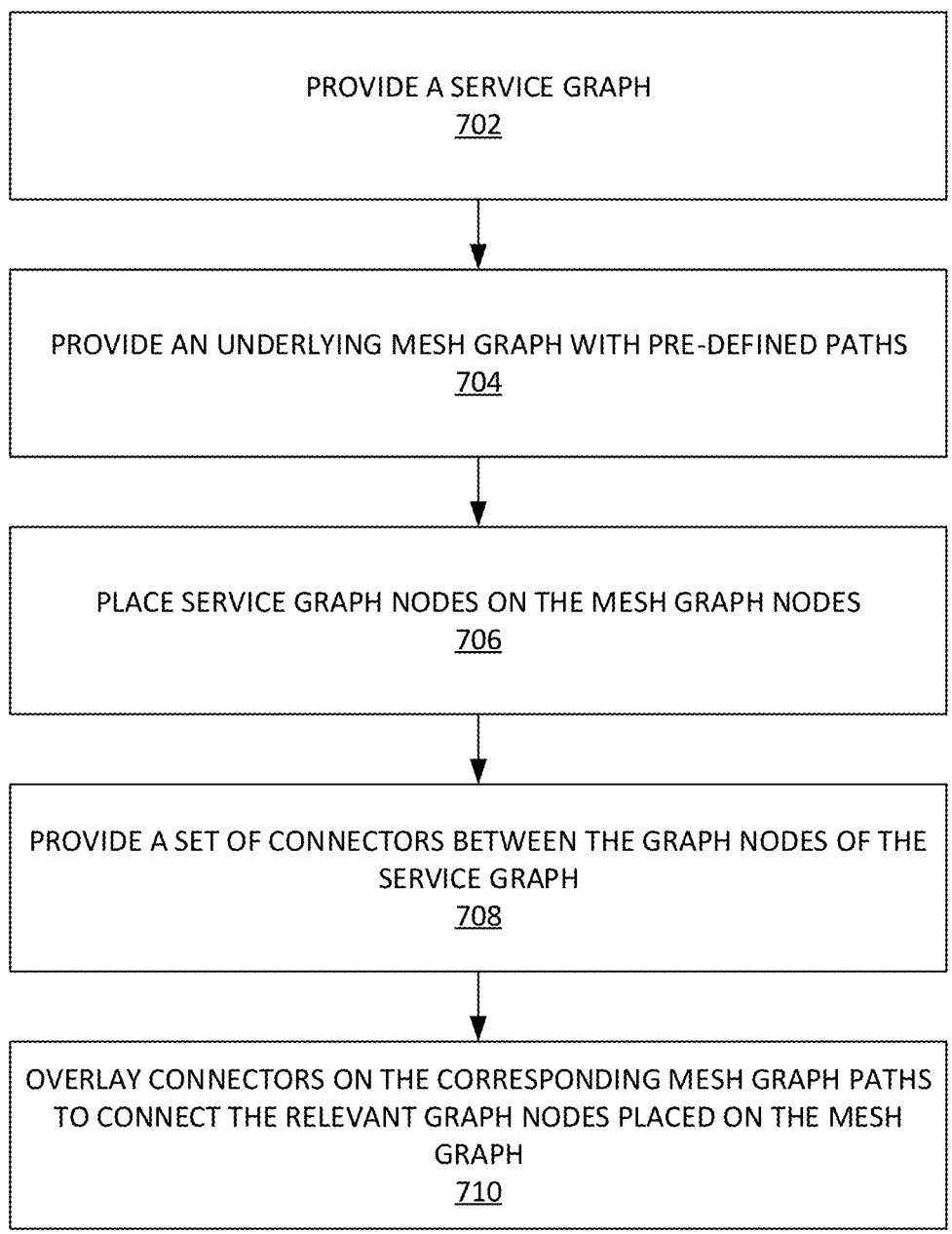
FIG. 7 illustrates an example process for generating an application security mesh with a service graph(s), according to some embodiments.

FIG. 7 illustrates an example process 700 for generating an application security mesh with a service graph(s), according to some embodiments. In step 702, process 700 can provide a service graph. In step 704, process 700 can provide an underlying mesh graph with pre-defined paths. In step 706, process 700 can place service graph nodes on the mesh graph nodes. In step 708, process 700 can provide a set of connectors between the graph nodes of the service graph. In step 710, process 700 can overlay connectors on the corresponding mesh graph paths to connect the relevant graph nodes placed on the mesh graph. Various algorithms (e.g. see FIG. 8 infra) can be utilized to optimize the routes of the connector lines between the service graph nodes placed on the mesh graph nodes. Additionally, mesh node paths can be differentiated as roads or highways.

Figure 8:
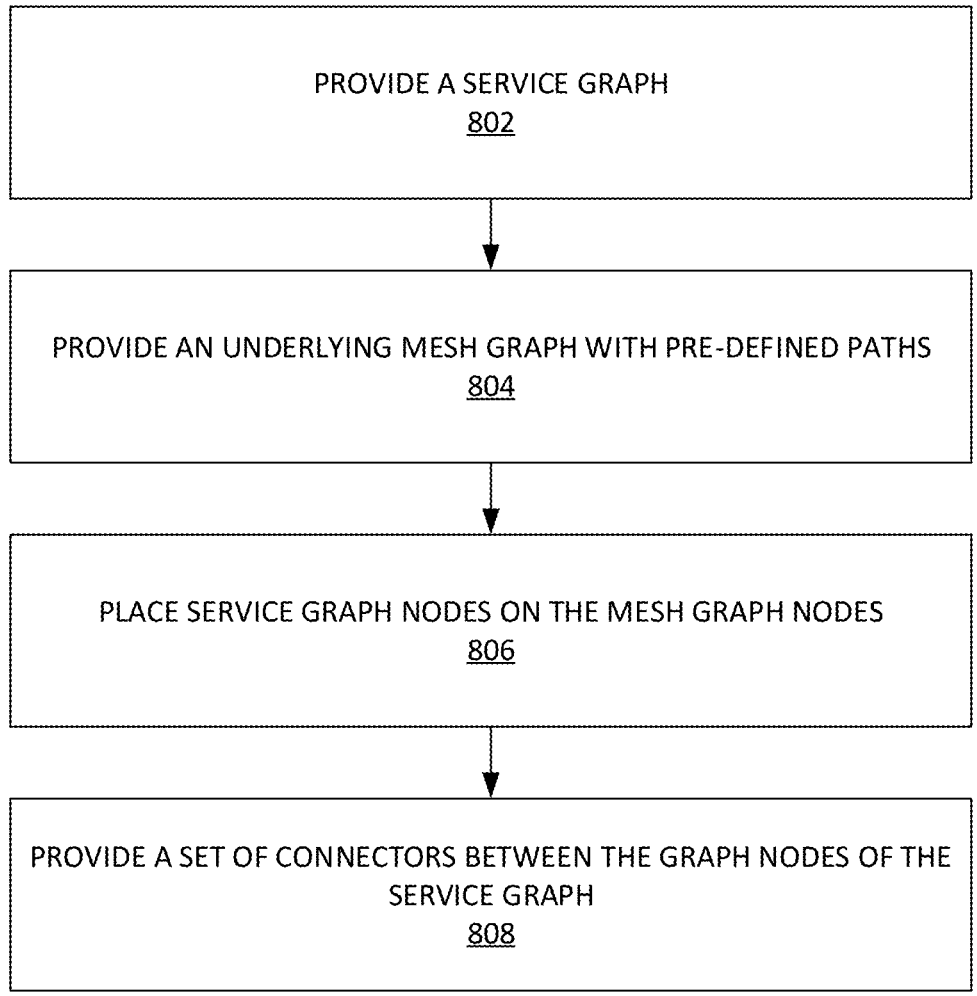
FIG. 8 illustrates an example process for optimizing connector line routes in an application security mesh, according to some embodiments.

FIG. 8 illustrates an example process 800 for optimizing connector line routes in an application security mesh, according to some embodiments. Process 800 can be used to provide that a connector interaction/line travels from one node to another node in the shortest possible route. In step 802, to travel from one source node to another destination node, process 800 can start from the source node and jump on to a local mesh road that connects to the source node. In step 804, process 800 can then next jump on to the closest mesh highway (whether north-south or east-west). In step 806, to reach the destination node, process 800 can determine to the local road that connects the destination node. This could be done either by exiting directly to the local road from the highway or take another highway (e.g. either jump from the north-south highway to the east-west highway or vice-versa). It is noted that machine learning algorithms and/or training data sets can be used to optimize process 800.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning. Random forests (RF) (e.g. random decision forests) are an ensemble learning method for classification, regression and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping—stop training when the error on the validation dataset increases, as this is a sign of overfitting to the training dataset. This procedure is complicated in practice by the fact that the validation dataset's error may fluctuate during training, producing multiple local minima. This complication has led to the creation of many ad-hoc rules for deciding when overfitting has truly begun. Finally, the test dataset is a dataset used to provide an unbiased evaluation of a final model fit on the training dataset. If the data in the test dataset has never been used in training (for example in cross-validation), the test dataset is also called a holdout dataset.

Figure 3:
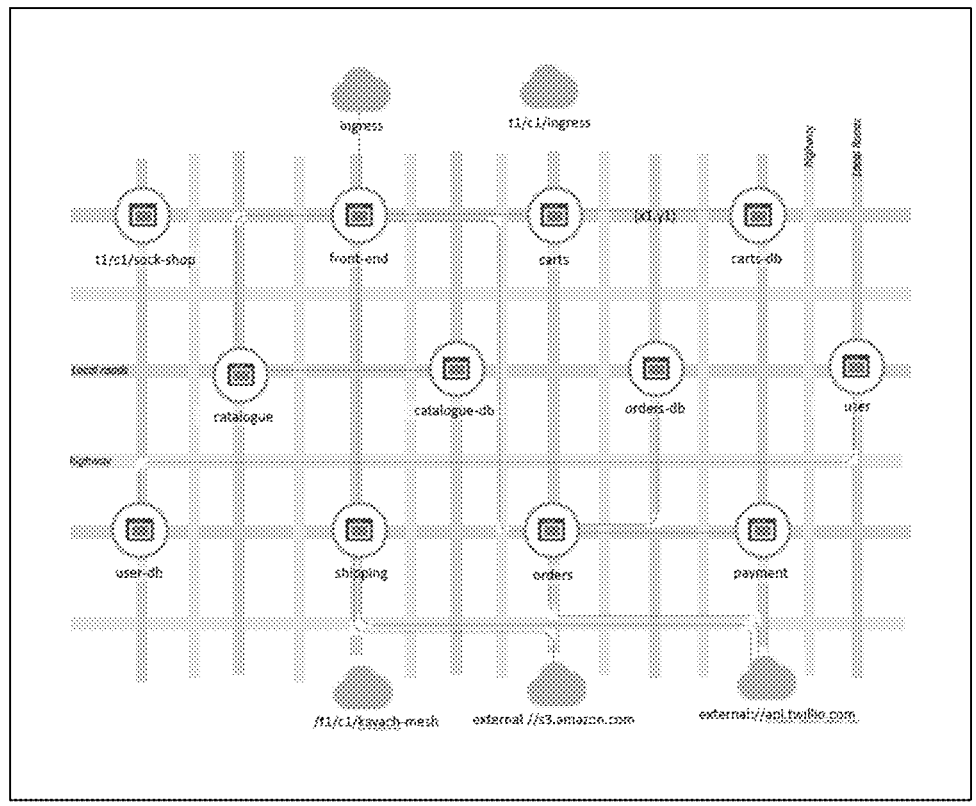
FIGS. 3-6 illustrates example views of various service graph layouts of an application security mesh according to some embodiments.
Figure 4:
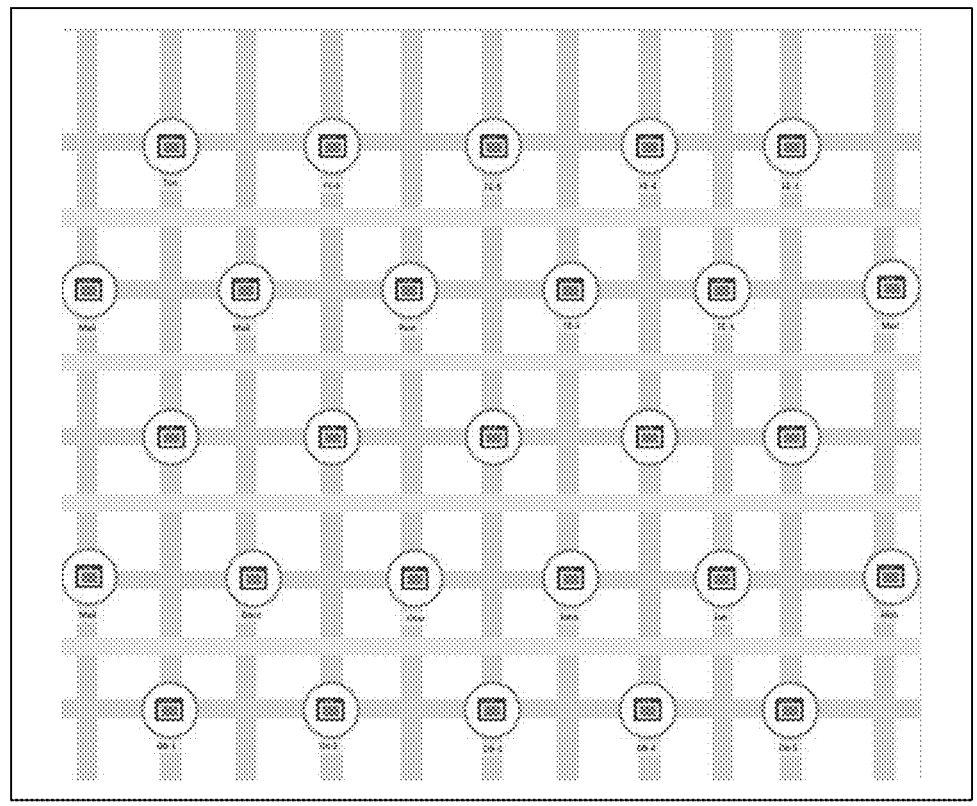
Figure 5:
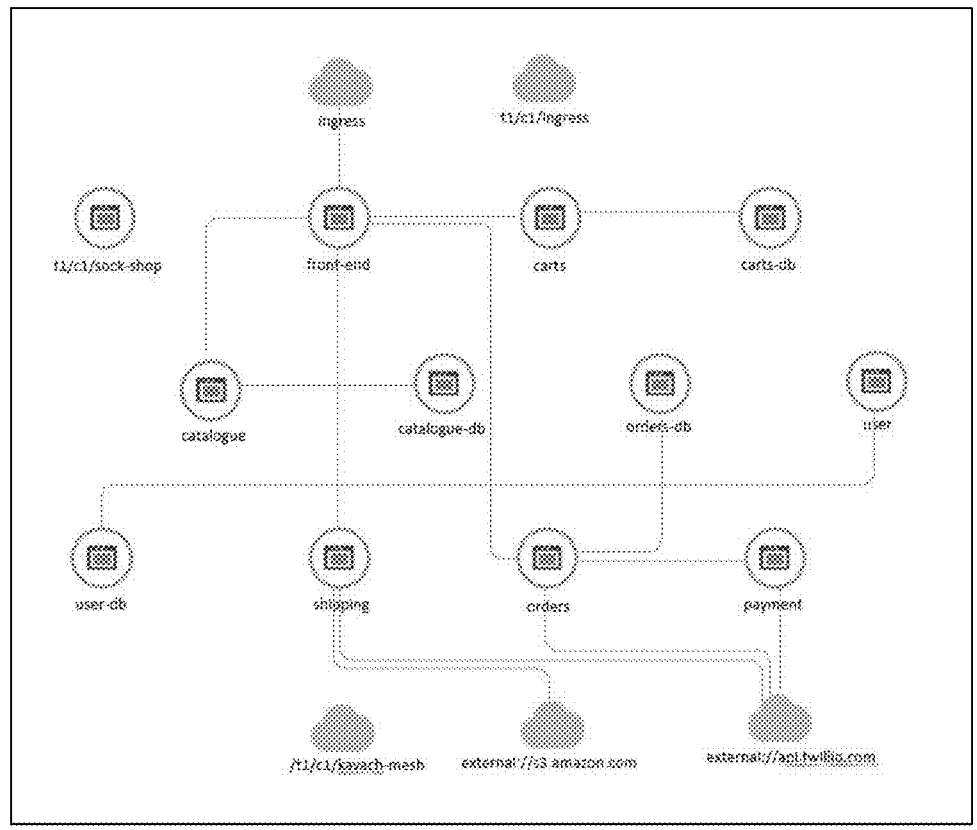
Figure 6:
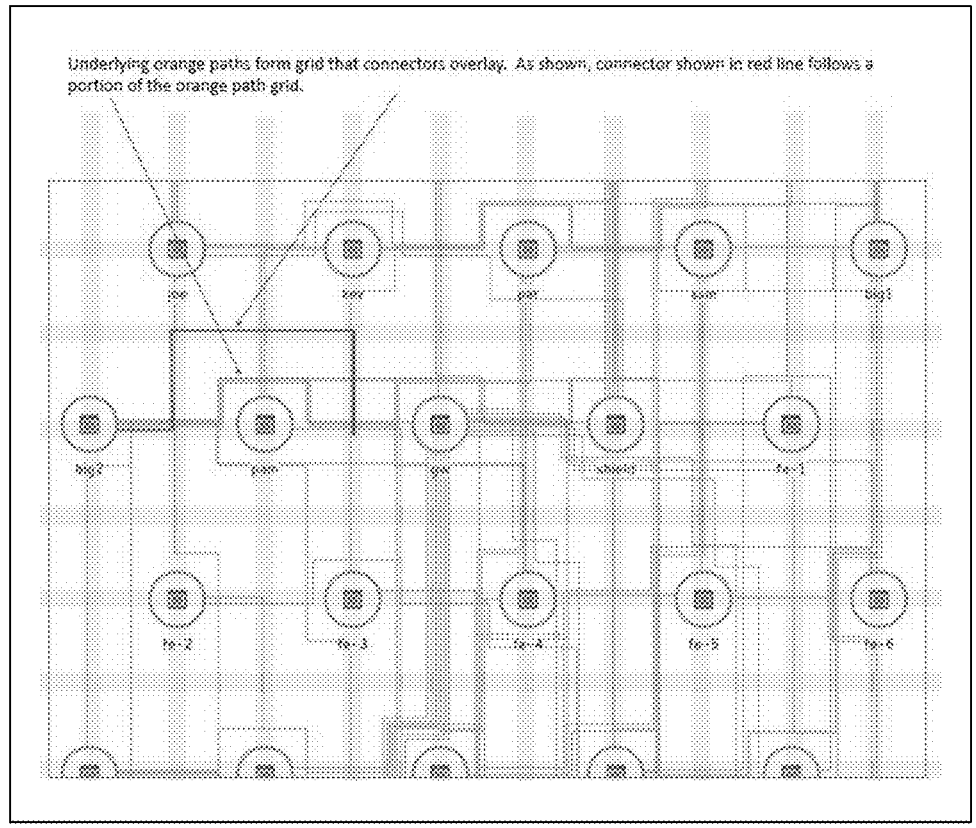

Processes 700 and 800 can be used to develop the example application security mesh provided in FIG. 3 supra. The following algorithm is used to ensure that an interaction/line can go from one node to another in the shortest way possible. To go from one source node to another destination node, application security mesh processes can start from the source node and jump on to a local road that connects to the source node. Next application security mesh processes can implement a jump on to the closest highway (e.g. whether north-south or east-west).

As shown in FIGS. 9-18 and FIGS. 3-6 infra, the service graph layout include circles within the service graph layout. These circles are node icons that are generic and uniform across all kinds of nodes. In various embodiments, the nodes can be circular, hexagons, and/or other similar shapes. These nodes can include specific icons in the center that represents the types of service and/or workload the node represents. For example, the specific icon can indicate a web service, database service, a user, or a Kubernetes pod, virtual machine, serverless function, etc.

To reach the destination node, application security mesh processes can use a local road that connects the destination node. This can be done either by exiting directly to the local road from the highway or take another highway (e.g. either jump from the north-south highway to the east-west highway or vice-versa). Application security mesh processes can be used to determine the mesh-layouts of the other relevant figures supra and/or in FIG. 9 and Appendix A of the provisional application incorporated herein by references.

Additional information regarding application security meshes is now provided. A couple of other aspects about the service graph. Service interactions can be shown as two-way traffic. Users can be able to zoom in and out of the graphical view, and depending on the level of zoom different pieces of information show up. For example, as a user zooms in more, more information is displayed at an increasingly granular level. Appendix C illustrates a series of example designs showing various zoom functionalities and designs.

The service graph portion of the application security mesh can have a timeline at the at the bottom that enables a user can go back and forward in time. The service graph portion can include a button next to the timeline to switch to the 'live' view of data. The service graph portion can include a method to 'freeze' the system to a particular moment in time and view all visibility and analytics for that moment. This can be visible when the user is accessing different charts/graphs etc. For example, an administer can be provide a live traffic and a past view. The service graph portion of the application security mesh can have a replay functionality. For example, once a user has frozen the system to a historical point on the timeline, the user is able to play from that point to the current time to see what all changed. The service graph portion of the application security mesh can show icons on whether the interaction is encrypted or other characteristics of the interaction. In one example, in the service graph, the user can click on any of the service-icons and get some basic information about the service on a side-bar pop-up. When clicked, only the services that are interacting with this chosen service are then highlighted. The other services can be displayed, but be faded Users can click on the side-bar pop-up to get to a more detailed analytics page.

The application security mesh with a service graph can be comprehensive and provide a view of traffic in all directions (e.g. traffic that comes into the application environment from partner applications and other sources (e.g. north-south), traffic that is being sent between the different application workloads (e.g. east-west), and traffic that egresses out to partner and other SaaS applications (i.e. "south-north"), etc.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

The invention claimed is:

1. A method for modeling interactions between different nodes of an application security mesh comprising:
    providing a service graph, wherein the service graph comprises a set of service graph nodes, wherein each service graph node in the set of service graph nodes represents a service or a workload;
    providing an underlying mesh graph comprising a set of pre-defined mesh graph paths comprises roads that touch one or more of service graph nodes in the set of service graph nodes and highways that do not touch any of the service graph nodes in the set of service graph nodes;
    placing the set of service graph nodes on the mesh graph, wherein each service graph node is positioned on the mesh graph at a respective location where two of the pre-defined mesh graph paths intersect; and
    providing a set of connectors between the set of service graph nodes of the service graph corresponding to particular interactions between respective service graph nodes, wherein each connector defines a line following a route between the respective service graph nodes on the pre-defined mesh graph paths; and
    wherein traveling along a particular connector between a source service graph node and a destination service graph node comprises:
    jumping from the source graph node to a first road connected to the source graph node;
    jumping from the first road to a closest mesh highway; and
    determining a second road that connects to the destination graph node either directly from the closest mesh highway or indirectly through jumps to one or more additional mesh highways.

2. The method of claim 1, wherein the highways are defined as lines that run top to bottom or lines that run side to side.

3. The method of claim 1, wherein each highway is perpendicular to another highway.

4. The method of claim 1, further comprising:
    optimizing the route from the source service graph node to the destination service graph node using machine learning to identify a shortest route.

5. The method of claim 1, wherein the application security mesh is used to address security and compliance issues for a set of distributed applications.

6. The method of claim 1, further comprising: presenting an application security mesh interface including the service graph and the underlying mesh graph.

7. The method of claim 6, wherein each node indicates a type of service or workload represented by the node and wherein each node further includes an indication of the health of the node.

8. A system for modeling interactions between different nodes of an application security mesh comprising one or more devices comprising hardware and software embodied in a machine-readable medium and configured to perform operations comprising:
    providing a service graph, wherein the service graph comprises a set of service graph nodes, wherein each service graph node in the set of service graph nodes represents a service or a workload;
    providing an underlying mesh graph comprising a set of pre-defined mesh graph paths comprises roads that touch one or more of service graph nodes in the set of service graph nodes and highways that do not touch any of the service graph nodes in the set of service graph nodes;
    placing the set of service graph nodes on the mesh graph, wherein each service graph node is positioned on the mesh graph at a respective location where two of the pre-defined mesh graph paths intersect; and
    providing a set of connectors between the set of service graph nodes of the service graph corresponding to particular interactions between respective service graph nodes, wherein each connector defines a line following a route between the respective service graph nodes on the pre-defined mesh graph paths; and
    wherein traveling along a particular connector between a source service graph node and a destination service graph node comprises:
    jumping from the source graph node to a first road connected to the source graph node;
    jumping from the first road to a closest mesh highway; and
    determining a second road that connects to the destination graph node either directly from the closest mesh highway or indirectly through jumps to one or more additional mesh highways.

9. The system of claim 8, wherein the highways are defined as lines that run top to bottom or lines that run side to side.

10. The system of claim 8, wherein each highway is perpendicular to another highway.

11. The system of claim 8, further comprising:
    optimizing the route from the source service graph node to the destination service graph node using machine learning to identify a shortest route.

12. The system of claim 8, wherein the application security mesh is used to addresses security and compliance issues for a set of distributed applications.

13. The system of claim 8, further comprising: presenting an application security mesh interface including the service graph and the underlying mesh graph.

14. The system of claim 13, wherein each node indicates a type of service or workload represented by the node and wherein each node further includes an indication of the health of the node.

15. One or non-transitory more machine-readable media embodying software configured to perform operations for modeling interactions between different nodes of an application security mesh comprising:
    providing a service graph, wherein the service graph comprises a set of service graph nodes, wherein each service graph node in the set of service graph nodes represents a service or a workload;
    providing an underlying mesh graph comprising a set of pre-defined mesh graph paths comprises roads that touch one or more of service graph nodes in the set of service graph nodes and highways that do not touch any of the service graph nodes in the set of service graph nodes;
    placing the set of service graph nodes on the mesh graph, wherein each service graph node is positioned on the mesh graph at a respective location where two of the pre-defined mesh graph paths intersect; and
    providing a set of connectors between the set of service graph nodes of the service graph corresponding to particular interactions between respective service graph nodes, wherein each connector defines a line following a route between the respective service graph nodes on the pre-defined mesh graph paths; and wherein traveling along a particular connector between a source service graph node and a destination service graph node comprises:

jumping from the source graph node to a first road connected to the source graph node;

jumping from the first road to a closest mesh highway; and determining a second road that connects to the destination graph node either directly from the closest mesh highway or indirectly through jumps to one or more additional mesh highways.

16. The machine-readable media of claim 15, wherein the highways are defined as lines that run top to bottom or lines that run side to side.

17. The non-transitory machine-readable media of claim 15, wherein each highway is perpendicular to another highway.

18. The non-transitory machine-readable media of claim 15, further comprising:

optimizing the route from the source service graph node to the destination service graph node using machine learning to identify a shortest route.

19. The non-transitory machine-readable media of claim 15, the application security mesh is used to addresses security and compliance issues for a set of distributed applications.

20. The non-transitory machine-readable media of claim 15, further comprising: presenting an application security mesh interface including the service graph and the underlying mesh graph.

21. The non-transitory machine-readable media of claim 20, wherein each node indicates a type of service or workload represented by the node and wherein each node further includes an indication of the health of the node.

* * * * *